Aug. 14, 1928.
W. M. AUSTIN
1,680,405
MOTOR OPERATED CIRCUIT INTERRUPTER
Filed May 12, 1923        5 Sheets-Sheet 1
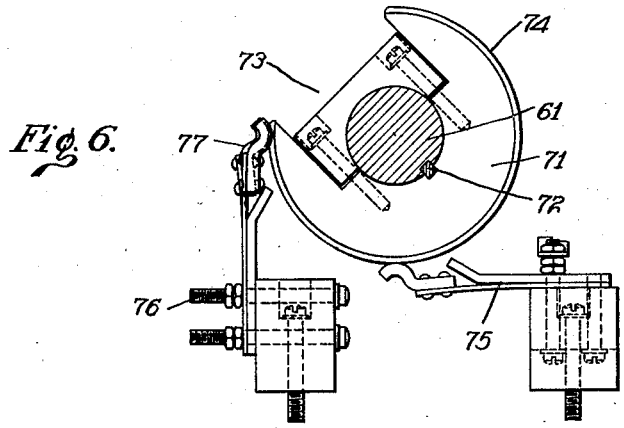
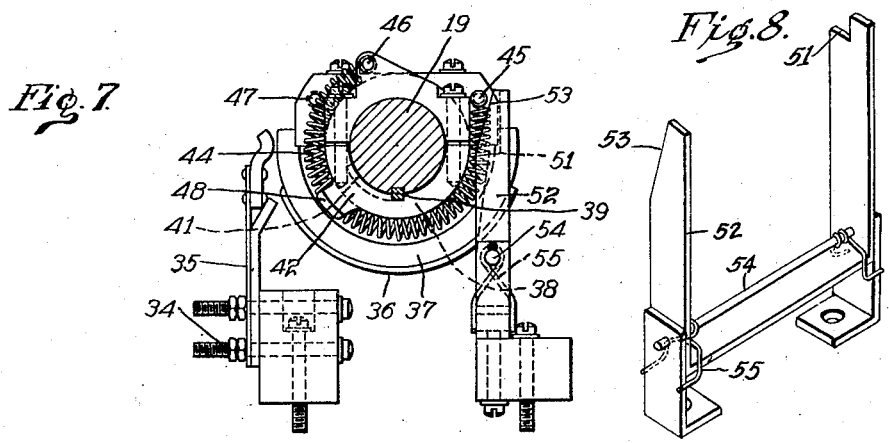
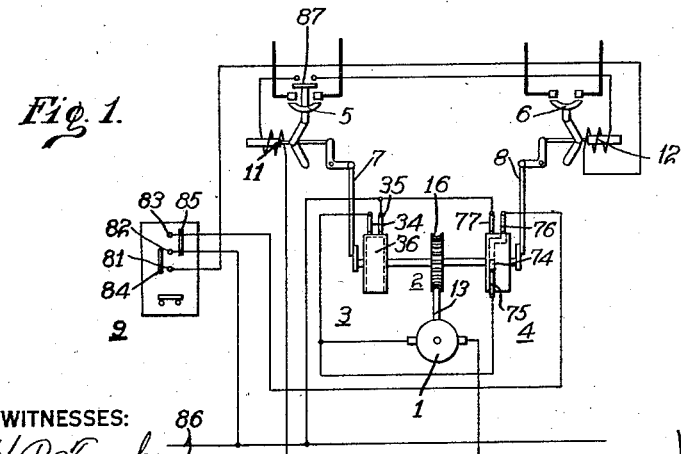
WITNESSES:
INVENTOR
Walter M. Austin
BY
                    ATTORNEY

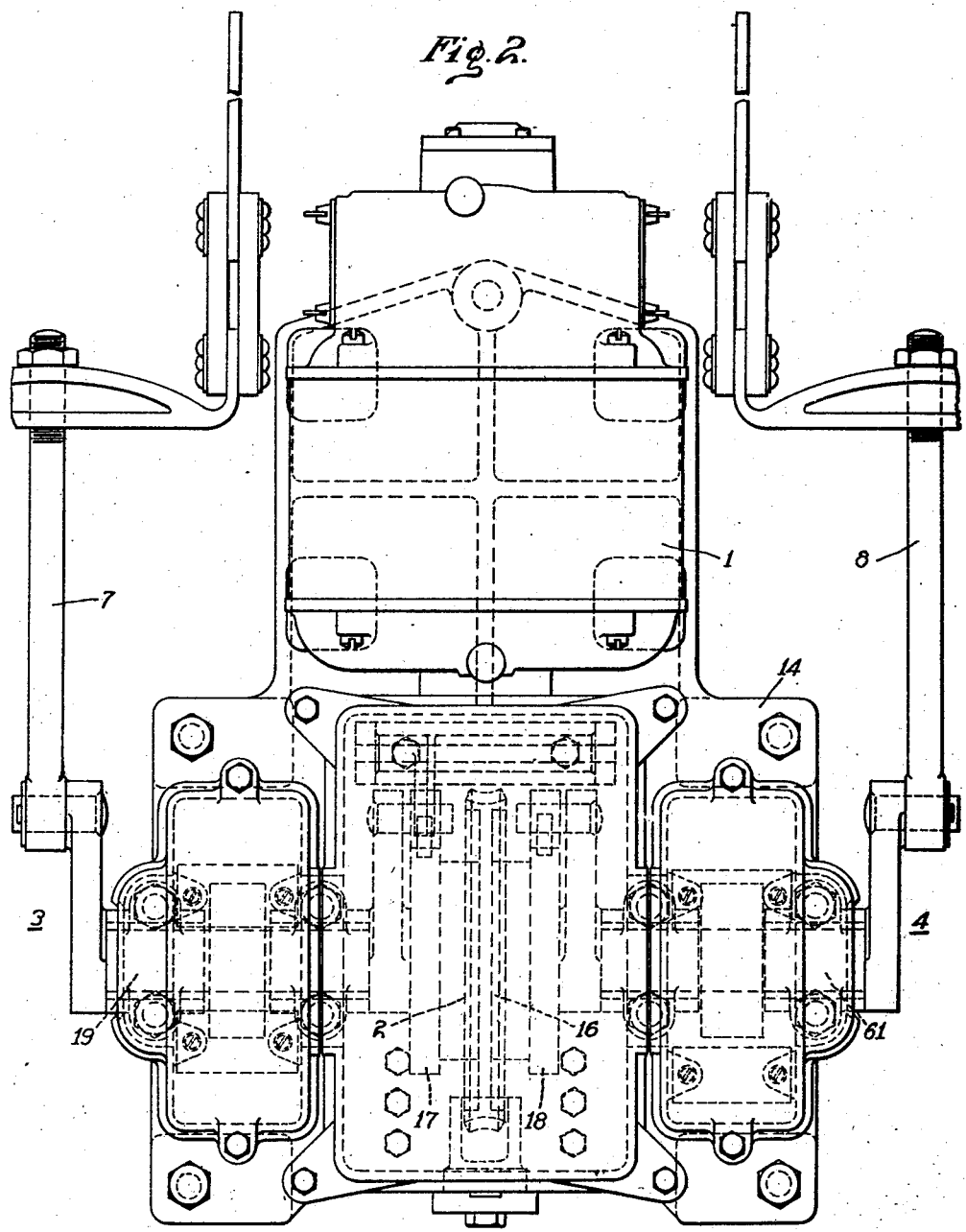

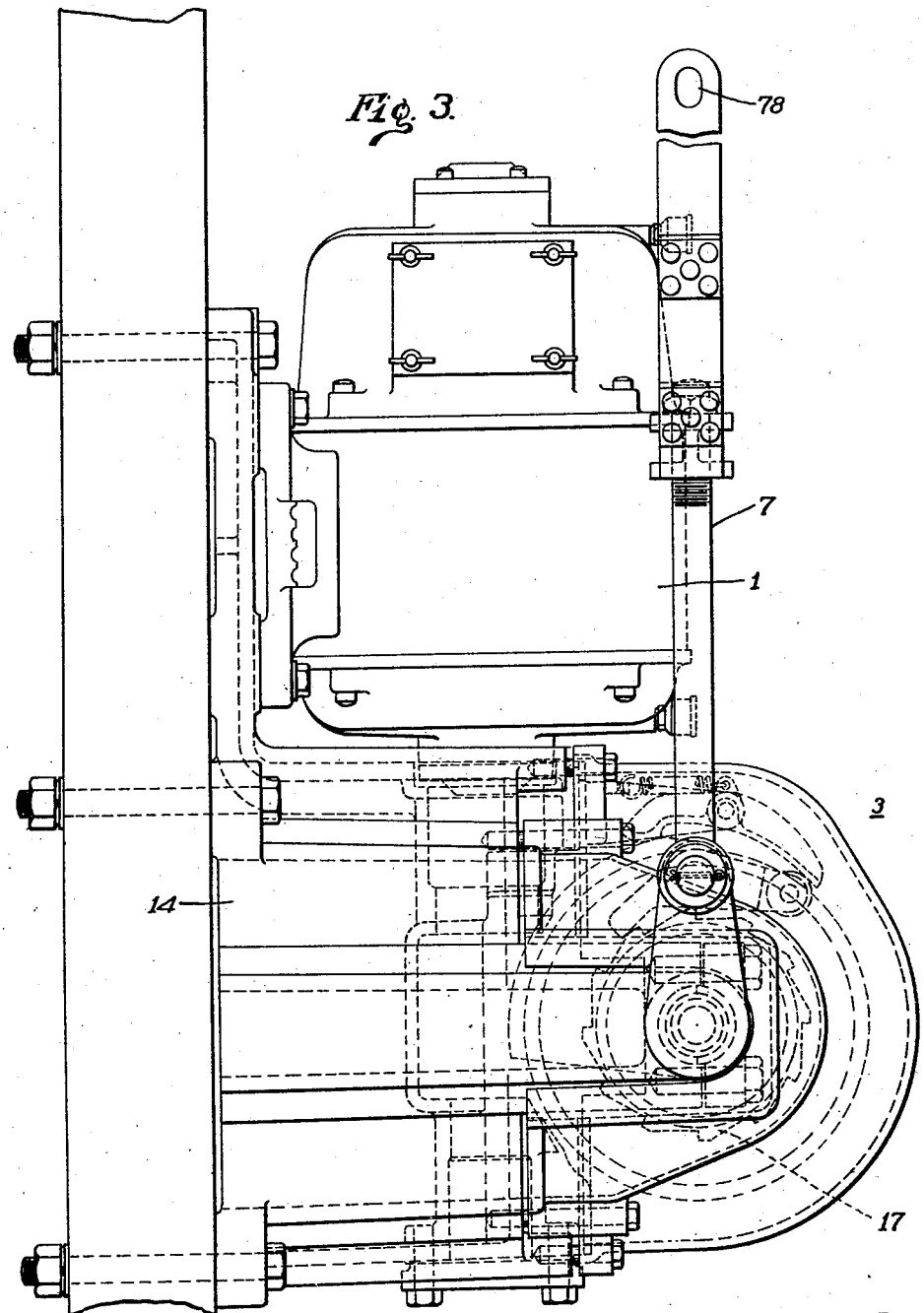

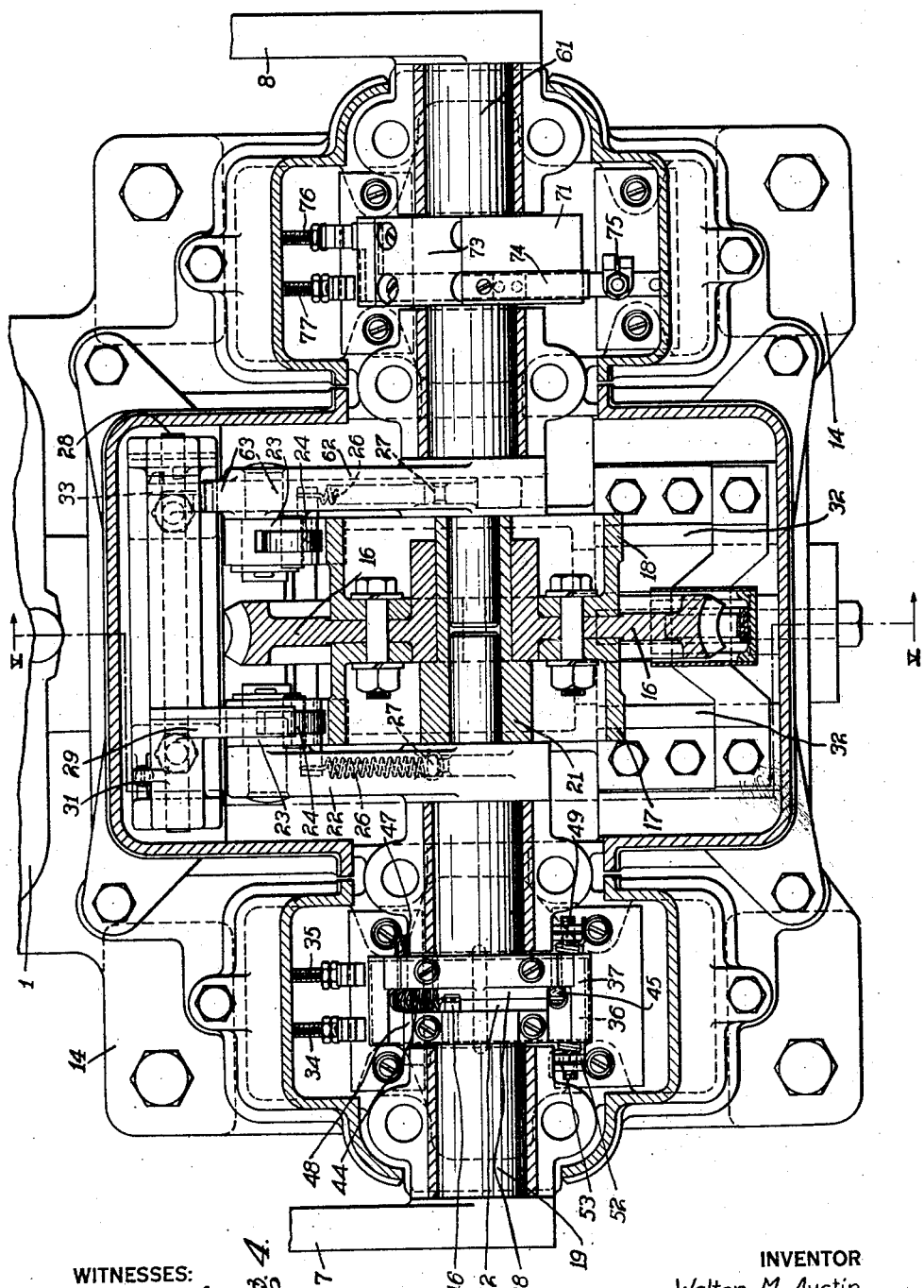

Aug. 14, 1928.

W. M. AUSTIN 1,680,405

MOTOR OPERATED CIRCUIT INTERRUPTER

Filed May 12, 1923 5 Sheets-Sheet 5

WITNESSES:

INVENTOR
Walter M. Austin.
BY
ATTORNEY

Patented Aug. 14, 1928.

1,680,405

UNITED STATES PATENT OFFICE.

WALTER M. AUSTIN, OF SWISSVALE, PENNSYLVANIA, ASSIGNOR TO WESTINGHOUSE ELECTRIC & MANUFACTURING COMPANY, A CORPORATION OF PENNSYLVANIA.

MOTOR-OPERATED CIRCUIT INTERRUPTER.

Application filed May 12, 1923. Serial No. 638,514.

My invention relates to circuit interrupters and more particularly to motor-operated controlling devices therefor.

An object of my invention is to provide a motor-operated circuit-controlling device for closing a plurality of circuit interrupters in sequence.

Another object of my invention is to provide a motor-operated circuit-controlling device for closing the several lines of electrical circuits in sequence in such manner that the motor is at all times controlled in accordance with the position of the several circuit interrupters.

Another object of my invention is to provide a motor-operated circuit-interrupter controlling device which is of such size and shape that it may be mounted in a vertical position upon an ordinary switch panel.

It is a further object of my invention to provide a motor-operated circuit-interrupter controlling device having an improved switching mechanism for controlling the motor during the several stages in the operation of the device.

In the accompanying drawings:

Figure 1 is a diagrammatic view of circuits and apparatus comprising a circuit-interrupter operating mechanism embodying my invention, Fig. 2 is a plan view thereof, Fig. 3 is a side view thereof, Fig. 4 is a view, partially in elevation and partially in section along the line IV—IV of Fig. 3.

Fig. 6 is a view in elevation of a switch structure forming a part of my invention; and Fig. 7 is a view in elevation of another switch structure forming a part of my invention.

Fig. 8 is a perspective view of a switch detail.

In the several views similar reference numerals indicate like parts.

Figure 5:
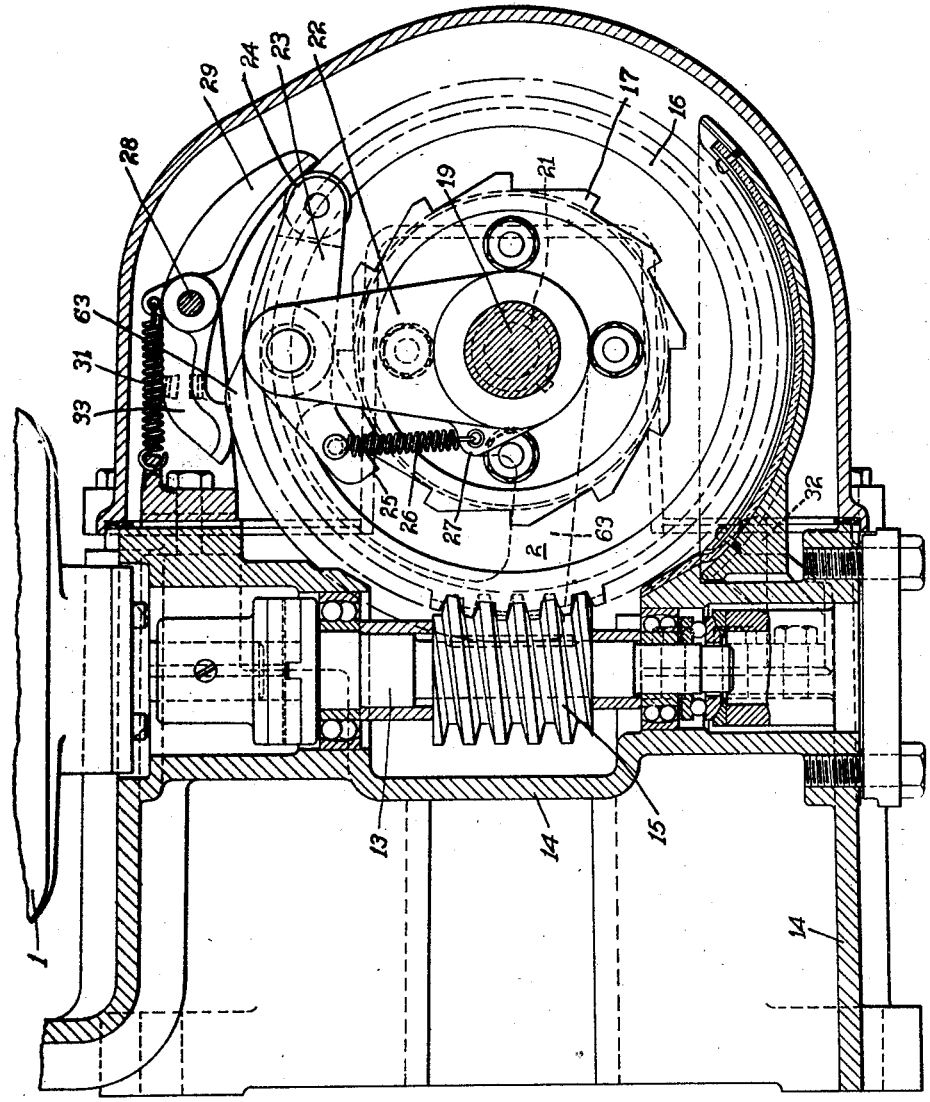
Fig. 5 is a view, partially in elevation and partially in section along the line V—V of Fig. 4.

As is shown in Fig. 1, my improved circuit-interrupter operating mechanism comprises a motor 1, a gear train 2, connected thereto, selective switches and coupling members 3 and 4 which are adapted for actuating circuit interrupters 5 and 6 through toggles 7 and 8, respectively, and a master switch 9. Master switch 9 is connected to trip coils 11 and 12 for controlling the circuit interrupters 5 and 6, respectively. The foregoing primary elements are electrically and mechanically interconnected in a manner more fully hereinafter set forth.

By reference to Figs. 1 and 5, it will be seen that the motor 1 is directly connected to a shaft 13 that is mounted in a frame 14 and is provided with a worm 15 for actuating a gear wheel 16. Ratchet wheels 17 and 18 are bolted to the left-hand and the right-hand sides of the gear wheel 16, respectively.

The left-hand selective mechanism 3 is best shown in elevation in Fig. 3 and in detail in Figs. 4 and 5. The toggle 7 is connected to the frame 14 through a shaft 19 which is loosely fitted within the hub 21 of the gear wheel 16. A crank arm 22 is carried near the inner end of the shaft 19. The arm 22 carries a pawl 23, one end of which terminates in a roller 24 while the other end is provided with a face 25 for engagement with the teeth on the ratchet 17. A tension spring 26 is attached to the pawl 23 adjacent to the face 25 and to a boss 27 mounted on the crank 22 adjacent the shaft 19.

A shaft 28 is supported on the frame 14 at right angles to, and extends beyond, the sides of the gear wheel 16, but is out of contact therewith. At the left-hand end of the shaft 28, there is a rocker arm 29 for engagement with the roller 24. Arm 29 is secured by a spring 31 to the frame 14. A trip 32 is mounted on the frame 14 in the path of the roller 24. The other end of shaft 28 carries a rocker arm 33 for a purpose to be hereinafter set forth.

The selected switching feature of the mechanism 3 is shown in Figs. 4 and 7. A pair of electrical terminals 34 and 35 are mounted on, and insulated from, the frame 14 in such manner as to be normally out of electrical contact with a conductor 36 carried by an insulated strip 37 mounted on a hub 38 which is loosely keyed to the shaft 19, as at 39. By reason of a relatively wide slot 41, the hub 38 has substantially sixty degrees of lost motion relative to the shaft 19. A second hub 42 is secured by the key 39 to the shaft 19.

A spring 44 is secured to the hub 38 by a pin 45, and to the hub 42 by a pin 46. The hub 38 carries a pin 47, and the hub 42 carries a projection 48, for purposes hereinafter described.

A resilient arm 49 is mounted on the frame 14 adjacent to the hub 38 and is provided with a notch 51 which is normally in the path of travel of the pin 47. A second resilient arm 52, mounted on the frame 14 adjacent to the hub 42, is provided with an inclined face 53 which is in the path of travel of the projection 48. As is shown in Fig. 7, the arms 49 and 52 comprise the legs of a strap of U-shape that is pivotally mounted on the shaft 54 and is controlled by a coiled spring 55.

The right-hand selective mechanism 4 is similar to the left-hand mechanism 3 in that the toggle 8 is secured to a shaft 61 supporting a crank arm 62 which correspond to the shaft 19 and the crank arm 22, respectively. As is shown in Figs. 4 and 5, the arm 62 is provided with a depending flange or cam 63 which engages the rocker arm 33 that is mounted on the shaft 28. The other mechanical details of the selective mechanisms are identical, as may be seen by a comparison of the corresponding reference numerals in Fig. 4.

The electrical switch at the right-hand side of the device varies materially from the switch at the left-hand side of the device. The switch comprises a hub 71 which is secured by a key 72 to the shaft 61. The surface of the hub 71 is of regular contour for more than 270 degrees of its circumference while the remaining circumference is interrupted by a recess 73. As is shown in Figs. 1 and 4, a conductor 74 of Z-shape is secured to the hub 71. This conductor normally connects terminals 75 and 76, while connection may be made between terminals 75 and 77 upon turning the shaft 61.

As shown in Fig. 3, the toggles 7 and 8 are provided with elongated connecting openings 78 for a purpose to be hereinafter set forth.

The master switch 9 comprises a plurality of stationary contact members 81, 82 and 83, together with movable contact members 84 and 85. A supply circuit 86 is provided for operating the device. A pilot switch 87 is associated with the circuit interrupter 5.

To close the circuit interrupters 5 and 6 from the positions in which they are shown in Fig. 1, stationary contact members 82 and 83 are bridged by the movable contact member 85 to complete an electrical circuit through terminals 75 and 76 and the motor 1 across the supply circuit 86. Upon rotation of the motor 1, gear wheel 16 is turned in a clockwise direction as viewed in Figs. 3 and 5.

A tooth on the ratchet 18 engages the face 25 of the associated pawl 23, by reason of the biasing action of the spring 26. A turning movement is thereby imparted to the crank arm 62 with an accompanying movement downwardly of the toggle 8. This movement continues until the crank arm 62 has moved through approximately 180° at which point the circuit interrupter 6 is closed.

Immediately after the circuit interrupter 6 is closed, the roller 24 impinges on the cam-like surface of the trip 32. Further movement of the crank arm 62 forces the roller 24 toward the axis of the shaft 61 rotating the pawl 23 and disengaging the face 25 from the tooth of the ratchet 18 permitting the crank arm 62 to stop. Movement of the crank 62 a few degrees beyond dead center does not tend to open the circuit interrupter 6, because of the lost motion in the opening 78.

So soon as the shaft 61 has turned through a few degrees, and connection is made between terminals 75 and 77 by reason of the changed position of the Z-shaped conductor 74, the circuit between the terminals 75 and 76 is broken. As is shown in Fig. 1, this change of electrical connections short-circuits the master switch 9 and the motor 1 operates directly from the supply circuit 86. This connection exists until the recess 73 turns to a position opposite the contact terminal 75, when the circuit is interrupted.

During the first 90° of movement of the crank 62, the dependent flange 63 engages the rocker arm 33, as is shown in Fig. 5, which turns the shaft 28 in a clockwise direction against the bias of spring 31. The shaft 28 in turn causes the rocker arm 29 to engage the roller 24 mounted on the left-hand pawl 23. The face 25 of the pawl 23 is accordingly held out of engagement with the teeth of the ratchet 17, against the bias of the left-hand spring 26.

When the right-hand mechanism 4 has turned through a little more than 90°, the flange 63 is suddenly withdrawn from engagement with the arm 33 whereupon engagement is made between the left-hand pawl 23 and the ratchet 17, by reason of the contraction of spring 26.

Toggle 7 is accordingly actuated from the gear wheel 16, and the circuit interrupter 5 is closed in the same manner as the circuit interrupter 6 is operated. It is to be observed that the right-hand circuit interrupter 6 is closed an appreciable time interval in advance of the closing of the left-hand circuit interrupter 5.

When the crank 22 has turned through slightly more than 180°, the left-hand roller 24 engages the left-hand trip 32, thereby releasing the crank 22 from the ratchet 17, in the manner described in connection with the right-hand releasing operation. Since the circuit interrupter 6 is closed and released from its actuating mechanism 4 before the circuit interrupter 5 is closed, the device is full automatic, or trip free on overload.

Referring now to Figs. 4 and 7, during the first 120° of rotation of the shaft 19, the hub 42 moves the hub 38 by means of the initial tension in the spring 44 bringing the conductor 36 into contact with the terminals 34 and 35. By reference to Fig. 1, it will be seen that the motor 1 is then controlled by parallel circuits embracing both the right and left-hand switches.

Shortly after the closing of the circuit of the motor 1 through the left-hand switch, the right-hand switch is opened, as has been previously explained, thereby leaving only the left-hand switch for control operations.

The hub 38 continues to turn until the pin 47 engages the notch 51 and is thereby stopped. The hub 42 continues to turn and elongates the spring 44 until the projection 48 engages the inclined face 53. Movement of the projection 48 along the face 53 causes the arms 49 and 52 to be forced outwardly against the spring 55, thereby disengaging the pin 47 from the notch 51.

Spring 44 immediately contracts causing the hub 38 to rotate ahead of the hub 41, at the same time drawing the conductor 36 from between the terminals 34 and 35 with a positive snap action. Circuit to the motor 1 being thereby interrupted, the entire device comes to rest.

The pilot switch 87 is closed simultaneously with the circuit interrupter 5, thereby completing a circuit between the master switch 9 and the trip coils 11 and 12. This circuit is controlled by stationary contact members 81 and 82 together with a movable contact member 84. Any other suitable type of controlling means (not shown) may be placed in this tripping circuit.

When the circuit interrupters 5 and 6 are opened for any purpose the toggles 7 and 8 take up a certain amount of lost motion in the openings 78. The remainder of the movement is communicated to the crank arms 22 and 62 causing them and their associated electrical switches to complete the remaining portion of the cycle and assume positions for a successive operation of the device, such positions being shown in Figs. 3 and 5. Attention is called to the fact that this device is mounted in a vertical position on a switch panel, thereby enabling the force of gravity to aid in the resetting operation of the device.

In the event that it is desired to close both circuit interrupters 5 and 6 simultaneously, the depending flange 63, shaft 38, rocker arms 29 and 33 and the spring 31 are dispensed with. The left-hand switching mechanism is then disposed at the right-hand side of the device, and the present right-hand switch is eliminated.

It will thus be seen that I have provided a circuit-interrupter operating mechanism which closes the respective sides of the line or the several phases of the circuit in sequence and which is adapted to control the motor in accordance with the position of the several circuit interrupters during the successive stages of the operation of the device.

Although I have described a specific embodiment of my invention, it will be obvious to those skilled in the art that various modifications may be made in the details of construction and arrangement of parts without departing from the principles herein set forth. I desire, therefore, to be limited only to the spirit and scope of my invention, as set forth in the appended claims.

I claim as my invention:

1. In combination, a ratchet, a crank arm, a pawl carried by said crank arm for co-operation with said ratchet, and means having a cam surface, in the path of travel of said pawl and a second member disposed at a different point in the travel of said pawl for controlling the co-operation between said pawl and said ratchet.

2. In an operating device for a plurality of circuit interrupters, a gear wheel, a pair of crank arms, a flange associated with one of said crank arms, and means actuated by said flange for controlling the co-operation between the other crank arm and said gear wheel.

3. In an operating device for a plurality of circuit interrupters, a gear wheel, a pair of crank arms disposed at opposite sides of said gear wheel, a flange associated with one of said crank arms, and means actuated by said flange for controlling the co-operation between the other crank arm and said gear wheel in accordance with the position of said flanged crank arm.

4. In an operating mechanism for a plurality of circuit breakers, a motor-driven gear wheel, a ratchet wheel secured to each side of the gear wheel, a pair of oppositely disposed crank arms mounted on an axis coincident with that of said gear wheel but movable relatively to said gear wheel, and means operatively connected to each of the crank arms for selectively engaging the associated ratchet wheels whereby the crank arms are turned.

5. In an operating mechanism for a plurality of circuit breakers, a motor-driven gear wheel, a ratchet wheel secured to each side of the gear wheel, a pair of oppositely disposed crank arms mounted on an axis coincident with that of said gear wheel but movable relatively to said gear wheel, and a pawl operatively connected to each of the crank arms for selectively engaging the associated ratchet wheel whereby the crank arm is turned.

6. In an operating mechanism for a plurality of circuit breakers, a motor-driven gear wheel, a ratchet wheel secured to each side of the gear wheel, a pair of oppositely disposed crank arms mounted on an axis coincident with that of said gear wheel but movable relatively to said gear wheel, a pawl operatively connected to each of the crank arms for selectively engaging the associated ratchet wheel whereby the crank arms are turned, and means placed in the path of travel of the several pawls for connecting them to and disconnecting them from their respective ratchet wheels without reversing the direction of rotation of the gear wheel.

7. In a circuit-controlling device, a motor, a gear wheel connected thereto, a circular ratchet mounted on said gear wheel, a crank arm, a pawl mounted on said crank arm, and means depending solely upon the position of the crank arm for controlling of engagement with or disengagement from said ratchet by said pawl.

In testimony whereof, I have hereunto subscribed my name this 10th day of May, 1923.

WALTER M. AUSTIN.